United States Patent
Assarpour et al.

(10) Patent No.: US 8,660,132 B2
(45) Date of Patent: Feb. 25, 2014

(54) CONTROL PLANE PACKET PROCESSING AND LATENCY CONTROL

(75) Inventors: Hamid Assarpour, Arlington, MA (US); Jon Goldberg, Amherst, NH (US)

(73) Assignee: Avaya Inc., Basking Ridge, NJ (US)

( * ) Notice: Subject to any disclaimer, the term of this patent is extended or adjusted under 35 U.S.C. 154(b) by 312 days.

(21) Appl. No.: 12/939,871

(22) Filed: Nov. 4, 2010

(65) Prior Publication Data

US 2011/0317713 A1   Dec. 29, 2011

Related U.S. Application Data

(60) Provisional application No. 61/359,076, filed on Jun. 28, 2010.

(51) Int. Cl.
   *H04L 12/28*  (2006.01)
   *H04L 12/56*  (2011.01)
   *G01R 31/08*  (2006.01)
   *G06F 11/00*  (2006.01)
   *H04J 3/14*   (2006.01)

(52) U.S. Cl.
   USPC ........................................ 370/412; 370/236

(58) Field of Classification Search
   USPC ................... 370/236, 338, 412, 496
   See application file for complete search history.

(56) References Cited

U.S. PATENT DOCUMENTS

| | | | |
|---|---|---|---|
| 5,790,522 A | 8/1998 | Fichou et al. | |
| 6,434,137 B1 * | 8/2002 | Anderson et al. | 370/347 |
| 6,680,934 B1 * | 1/2004 | Cain | 370/352 |
| 7,916,687 B2 * | 3/2011 | Deshpande et al. | 370/328 |
| 2003/0198220 A1 * | 10/2003 | Gross et al. | 370/389 |
| 2004/0071154 A1 * | 4/2004 | Wentink | 370/448 |
| 2004/0174892 A1 * | 9/2004 | Jeong | 370/412 |
| 2007/0195742 A1 * | 8/2007 | Erdman et al. | 370/338 |
| 2007/0223383 A1 * | 9/2007 | Kamath et al. | 370/236 |
| 2009/0172123 A1 * | 7/2009 | Ewing | 709/206 |
| 2010/0172234 A1 * | 7/2010 | Thesling | 370/206 |
| 2011/0134830 A1 * | 6/2011 | Lin | 370/328 |
| 2011/0141957 A1 * | 6/2011 | Lansing et al. | 370/310 |
| 2012/0134342 A1 * | 5/2012 | Le et al. | 370/336 |

\* cited by examiner

*Primary Examiner* — Ayaz Sheikh
*Assistant Examiner* — Hoang-Chuong Vu
(74) *Attorney, Agent, or Firm* — Anderson Gorecki & Rouille LLP (57) ABSTRACT

A switch resource receives control plane packets and data packets. The control plane packets indicate how to configure the network in which the switch resource resides. The switch resource includes a classifier. The classifier classifies the control plane packets based on priority and stores the control plane packets into different packet priority queues. The switch resource also includes a flow controller. The forwarding manager selectively forwards the control plane packets stored in the control plane packet priority queues to a control plane packet processing environment depending on a completion status of processing previously forwarded control plane packets by a packet processing thread. The control plane packet processing environment includes a monitor resource that generates one or more interrupts to an operating system to ensure further forwarding of the packets downstream to the packet processing thread for timely processing.

19 Claims, 8 Drawing Sheets

CONTROL PLANE PACKET PROCESSING AND LATENCY CONTROL

RELATED APPLICATIONS

This Patent Application claims the benefit of earlier filed U.S. Provisional Patent Application Ser. No. 61/359,076 filed on Jun. 28, 2010, entitled, "METHOD AND APPARATUS FOR PROCESSING PACKETS," the entire teachings of which are hereby incorporated by this reference.

BACKGROUND

According to conventional systems, a control plane represents part of a network system defining how the network is to operate under one or more conditions. The control plane can include network maps and/or routing information indicating how to handle incoming data packets.

Configuration of the control plane in a network can include transmission of control plane packets amongst resources in a network. Control plane packets differ from regular data packets. For example, control plane packets are used to configure a network. On the other hand, data packets typically include data that is routed from a source to a destination based at least in part on a current configuration of the control plane as specified by the control plane packets.

BRIEF DESCRIPTION

There are deficiencies associated with conventional processing of control plane packets in a network environment. For example, according to conventional systems, a processing unit dedicated to processing control plane packets can become overburdened with a task of storing, scheduling, processing, etc., the control plane packets. Once overburdened, there is no certainty that a conventional control plane packet processing thread will be able to execute and/or process the control plane packets in a timely manner. In other words, based on conventional systems, a latency of processing control plane packets may become unacceptable for at least certain control plane packet. In such instance, conventional networks may not operate efficiently.

Embodiments herein deviate with respect to conventional systems for processing control plane packets. For example, embodiments herein are directed to unique ways of controlling a latency of processing control plane packets in a network environment.

More specifically, one embodiment herein includes a switch resource. The switch resource can receive control plane packets and data packets. The control plane packets indicate how to configure the switch resource and/or network in which the switch resource resides. The data packets include information routed to destination nodes outside of the switch resource. In one embodiment, the switch resource includes a classifier. The classifier classifies the received control plane packets. The classifier can classify the control plane packets based on priority and/or type. The classifier stores the control plane packets into a storage resource including different control plane packet priority queues. The switch resource also includes a flow controller.

By way of a non-limiting example, the flow controller selectively forwards the control plane packets stored in the control plane packet priority queues to a control plane packet processing environment depending on a completion status of processing previously forwarded control plane packets to the control plane packet processing environment. That is, in accordance with one embodiment, the flow controller controls or regulates a flow of the control plane packets to a target destination such as dedicated processing thread that processes the control plane packets. The target destination processes the control plane packets to configure the switch resource and/or a control plane of the network in which the switch resides.

In one embodiment, the flow controller maintains a variable such as a flow control value. According to one embodiment, at any given time, the flow control value indicates a current number of control plane packets that have been forwarded to and are pending completion of processing by a destination processing thread (e.g., a packet processing thread) dedicated to processing the control plane packets.

During operation, the flow controller selectively forwards the control plane packets stored in the control plane packet priority queues downstream to the packet processing thread depending on a magnitude of the flow control value. For example, in response to detecting that a magnitude of the flow control value is below a threshold value, which indicates that the packet processing thread can handle processing of at least one additional control plane packet, the flow controller retrieves a control plane packet from one of the control plane packet priority queues and forwards it downstream to the packet processing thread.

In accordance with further embodiments, in response to forwarding each control plane packet to the packet processing thread for processing, the flow controller adjusts the magnitude of the flow control value to indicate that the packet processing thread has been tasked with processing the recently forwarded control plane packet. The forwarding manager repeats the process of forwarding queued control plane packets until the flow control value reaches a threshold value. Once the threshold value is reached, the flow controller prevents forwarding of additional control plane packets in the queues so that the packet processing thread is not overburdened with simultaneously handling too many control plane packets. In this manner, the flow controller regulates a downstream flow of the control plane packets to the appropriate one or more packet processing threads that are dedicated to processing the data packets.

In accordance with further embodiments, the packet processing thread receives notification when the processing of the forwarded control plane packets by the packet processing thread has been completed. For each acknowledgment indicating completion of a forwarded control plane packet, the flow controller adjusts the flow control value. In one embodiment, the forwarding manager reduces the flow control value by a predetermined count value each time it receives an acknowledgment that processing has been completed for a previously forwarded control plane packet. When the flow control value is below a threshold value again, the forwarding manager retrieves a next control plane packet from the queues and forwards it to the packet processing thread for processing.

In this way, the forwarding manager can control or prevent forwarding of control plane packets from the control plane packet priority queue to the control plane packet processing environment to limit a number of control plane packets that are forwarded to the control plane packet processing environment for processing. In other words, at any given time, the packet processing thread need only process a certain number of control plane packets because the flow control value prevents inundating the packet processing thread with too many control plane packets.

As previously discussed, the flow controller forwards control plane packets downstream to a packet processing thread in the control plane packet processing environment. In accordance with further embodiments, the control plane packet processing environment includes a packet buffer to at least temporarily store the control plane packets. In one embodiment, the switch resource maintains the control plane packet priority queues external to memory in the control plane packet processing environment. A tag buffer stores tag values or labels indicating which, if any, control plane packets are currently stored in the packet buffer and are awaiting processing.

A monitor resource monitors the packet buffer. In one embodiment, the monitor resource maintains a time value (e.g., first parameter) indicative of how long one or more control plane packets have been stored in the packet buffer. In accordance with a same or different embodiment, the monitor resource maintains a packet count value (e.g., a second parameter) indicative of how many control plane packets are currently in the packet buffer that are awaiting processing by a packet processing thread in the control plane packet processing environment.

In addition to tracking how long the control plane packets are stored in the packet buffer, the flow controller can limit a number of control plane packets forwarded and stored in the packet buffer of the control plane packet processing environment to ensure processing of the control plane packets within a pre-specified amount of time.

As its name suggests, the monitor resource monitors the storage parameters. In response to detecting that the storage parameter exceeds a threshold value, the monitor resource initiates generation of an interrupt to an operating system (executing the control plane packet processing thread) to expedite scheduling and processing of the control plane packets currently stored in the packet buffer by the packet processing thread.

In one embodiment, in response to detecting that the time value exceeds a time threshold value, the monitor resource generates an interrupt signal to an operating system. In accordance with another embodiment, in response to detecting that the packet count value exceeds a count threshold value, the monitor resource generates an interrupt signal to the operating system. Generation of the interrupt can occur based one or both of these conditions (e.g., time or count greater than a threshold value) occurring.

Generation of the interrupt signal causes the operating system to execute a control plane packet forwarding processing thread. Execution of the control plane packet forwarding thread can be given higher or highest priority amongst applications executed by the operating system so that processing of the control plane packets in the packet buffer happens with little delay.

The control plane packet forwarding processing thread initiates forwarding of one or more notifications that the one or more control plane packets are awaiting processing by the packet processing thread. Based on the notification, the packet processing thread in the control plane packet processing environment becomes aware of the control plane packets in the packet buffer and eventually initiates execution of the control plane packets stored in the packet buffer.

Subsequent to completing processing of the control plane packets in the packet buffer, the packet processing thread provides notification of completing processing of the control plane packets to the flow controller. The flow controller then adjusts a magnitude of the flow control value to indicate that another control plane packet can be sent to the packet buffer.

In this way, the flow controller prevents the packet processing thread from being inundated with too many control plane packets at the same time. The monitor resource in the control plane packet processing environment ensures that a latency of processing the control plane packets is kept below an acceptable threshold value.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments as discussed herein.

Yet other embodiments herein include software programs to perform the steps and operations summarized above and disclosed in detail below. One such embodiment comprises a computer-readable, hardware storage resource including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting operations such as processing control plane packets. For example, in one embodiment, the instructions, when carried out by a processor of a respective computer device, cause the processor to: receive control plane packets and data packets; classify the control plane packets based on priority; store the control plane packets into different control plane packet priority queues; and selectively forward the control plane packets in the control plane packet priority queues to a control plane packet processing environment depending on a completion status of processing previously forwarded control plane packets to the control plane packet processing environment.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. As discussed above, techniques herein are well suited for use in software and/or hardware applications that process control plane packets. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a switch resource receives control plane packets and data packets. The control plane packets indicate how to configure the network in which the switch resource resides. The switch resource includes a classifier. The classifier classifies the control plane packets based on priority and stores the control plane packets into different packet priority queues. The switch resource also includes a flow controller. The flow controller manager selectively forwards the control plane packets stored in the control plane packet priority queues to a control plane packet processing environment depending on a completion status of processing previously forwarded control plane packets.

In one embodiment, the control plane packet processing environment includes a packet buffer to at least temporarily store the control plane packets forwarded by the flow controller. A monitor resource monitors storage of the control plane packets stored in the packet buffer. The monitor resource generates one or more interrupts to ensure timely forwarding of the control plane packets and/or notification of the control plane packets in the packet buffer to a downstream packet processing thread to timely process the control plane packets. Timely notification to a control plane packet processing thread that there are control plane packets in the packet buffer awaiting processing ensures that the control plane packets are processed within an appropriate amount of time by a control plane packet processing thread.

Figure 1:
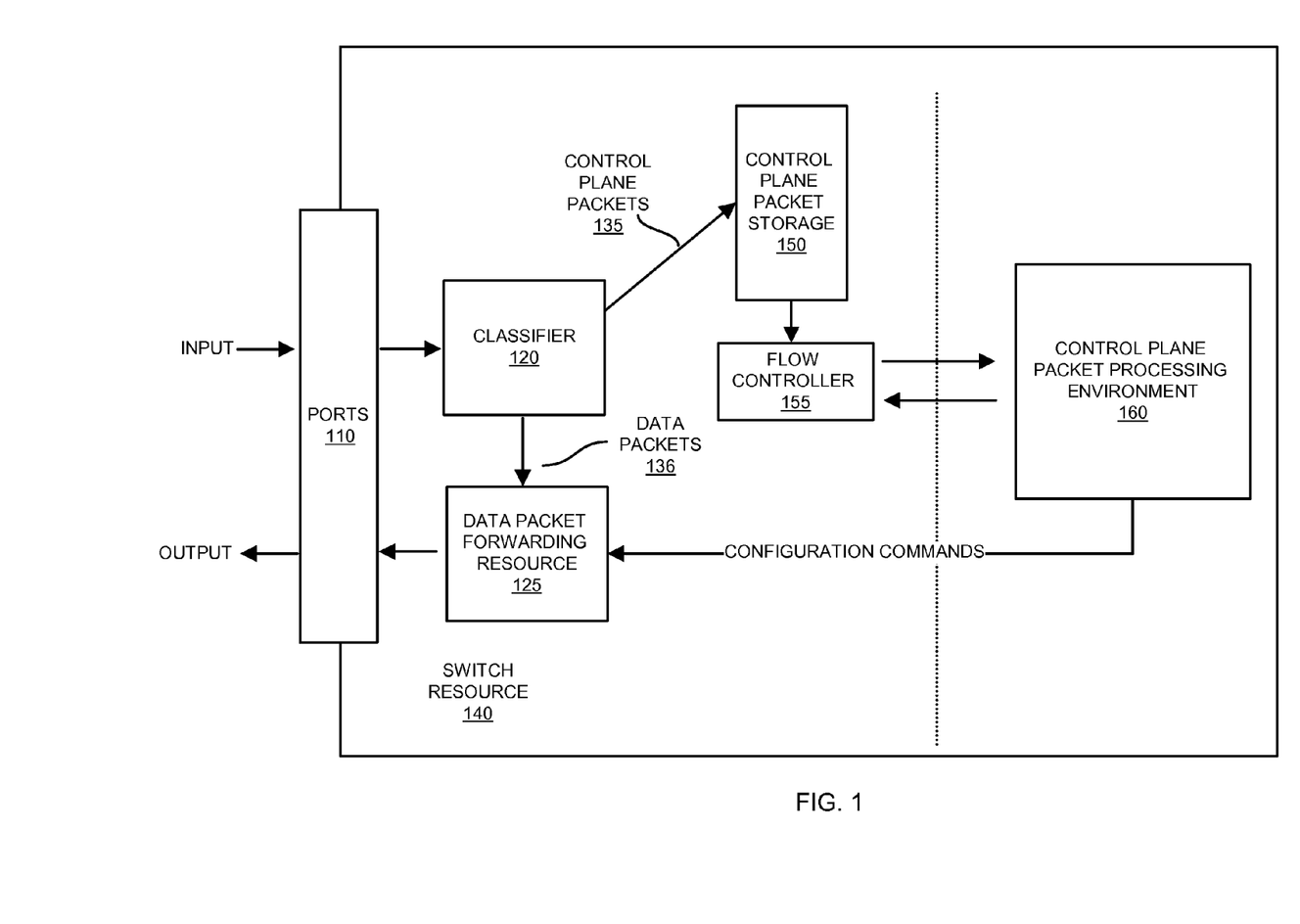
FIG. 1 is an example diagram of a switch resource including a flow controller according to embodiments herein.

FIG. 1 is an example control plane packet processing resource according to embodiments herein.

As shown, switch resource 140 includes ports 110 on which to receive control plane packets 135 and data packets 136. Classifier 120 classifies the received packets and forwards them according to type. For example, the classifier 120 forwards the control plane packets 135 to control plane packet storage 150. Classifier 120 forwards data packets 136 to data packet forwarding resource 125. Data packet forwarding resource 125 forwards data packets 136 to respective destinations based on the destination addresses of the data packets 136.

By way of a non-limiting example, the control plane packets 135 can include: configuration information indicating how to configure the switch resource 140 for forwarding data packets 136, keep alive packets received from other resources indicating that the other resources are still active, VLAN configuration, etc.

As its name suggests, the control plane packet storage 150 stores the control plane packets 135 received from the classifier 120. Rather than merely forwarding the control plane packets 135 to control plane packet processing environment 160 for processing as the control plane packets are received, embodiments herein include the flow controller 155. Flow controller 155 regulates a flow of the control plane packets 135 forwarded to the control plane packet processing environment 160.

As an example, the classifier 120 can classify the control plane packets 135 based on priority and/or type. The classifier 120 stores the control plane packets 135 into different packet priority queues of control plane packet storage 150 depending on type and/or priority. Flow controller 155 selectively forwards the control plane packets 135 stored in the control plane packet storage 150 to control plane packet processing environment 160 depending on a completion status of processing previously forwarded control plane packets 155 by a respective destination packet processing thread. In other words, the flow controller 155 can initiate forwarding a certain number of the control plane packets 135 stored in control plane packet storage 150 to the control plane packet processing environment 160. The control plane packet processing environment 160 processes the control plane packets 135 forwarded by the flow controller 155 and, among other things, configures the data packet forwarding resource 125 and/or other attributes of switch resource 140.

Upon completion of processing each respective control plane packet, the control plane packet processing environment 160 can notify the flow controller 155. In response to receiving the notification, and because a previously control plane packet has been processed, the flow controller 155 then forwards another control plane packet from control plane packet storage 150 to the control plane packet processing environment 160 for processing. The flow controller 155 regulates the flow of the control plane packets 135 so that the control plane packet processing environment 160 is not inundated with control plane packets 135.

In accordance with other embodiments, note that weight values can be assigned to the control plane packets. The weights can reflect a relative amount of processing resources required to complete processing of the respective control plane packet. In such an embodiment, the flow control value 210 would reflect a sum of the corresponding weight value of control plane packets forwarded to the control plane packet processing environment 160. Upon receiving notification that the control plane packet processing environment 160 completes processing of a respective control plane packet, the flow controller 155 adjusts a respective flow control value by the weight value of the respective control plane packet.

Figure 2:
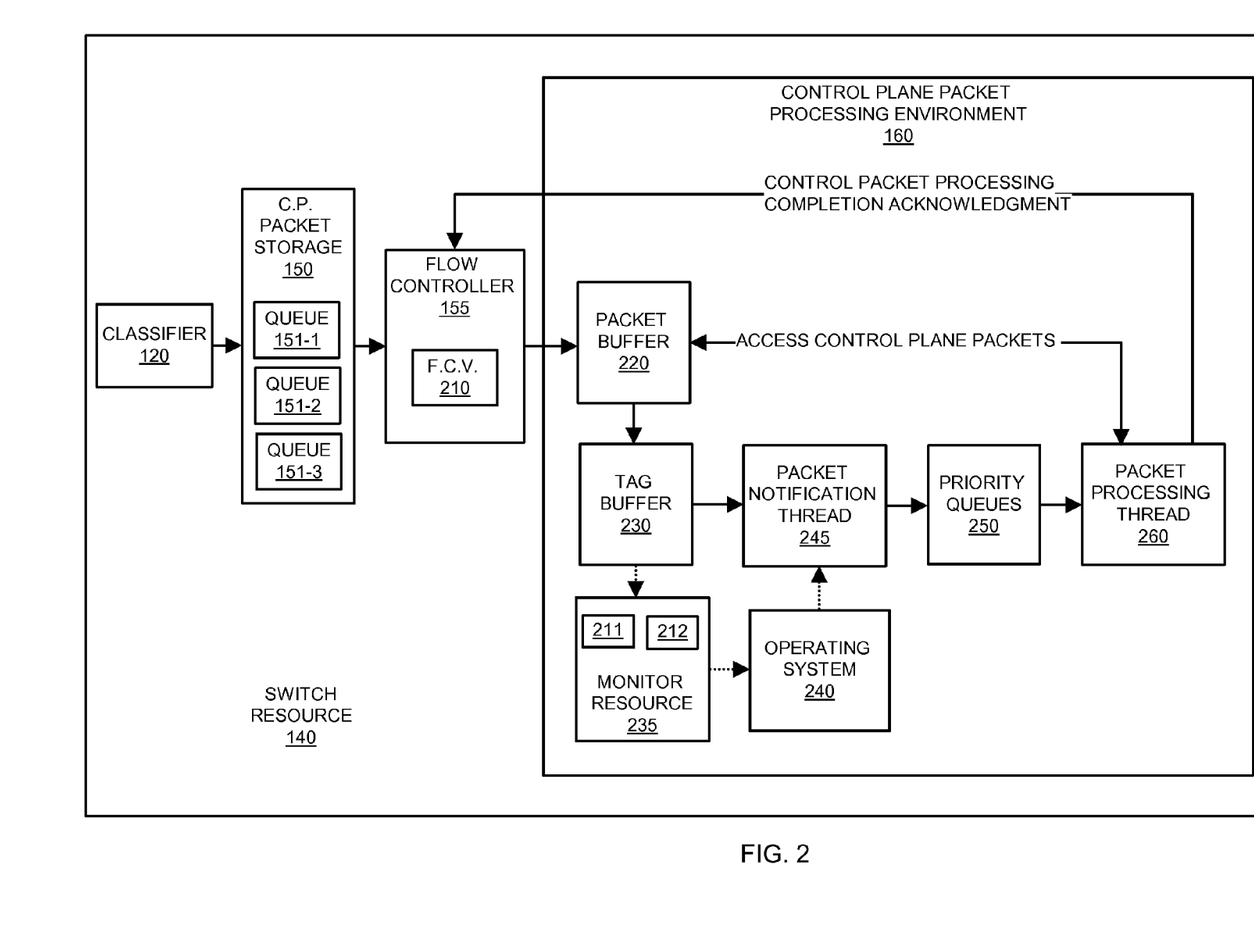
FIG. 2 is an example diagram of a flow controller and control plane packet processing environment according to embodiments herein.

FIG. 2 is a diagram illustrating attributes of an example control plane packet processing resource according to embodiments herein.

As shown in FIG. 2, switch resource can include classifier 120, control plane packet storage 150, flow controller 155, and control plane packet processing environment 160. By way of a non-limiting example, control plane packet storage can include multiple priority queues 151 (e.g., queue 151-1, queue 151-2, queue 151-3, . . . ).

In one embodiment, the flow controller 155 stores and maintains flow control value 210. Control plane packet processing environment 160 includes packet buffer 220, tag buffer 230, monitor resource 235, operating system 240, packet notification thread 245, priority queues 250, and packet processing thread 260.

Typically in embedded systems, multiple software applications run on an operating system resource such as operating system 240 in control plane packet processing environment 160. Each application can execute on a separate operating system process or processing thread. The operating system 240 associated with the control plane packet processing environment 160 can be configured to manage scheduling of these applications based on certain scheduling parameters such as priority, class, and weight, etc. associated with each of the applications. Certain applications in the control plane packet processing environment 160 and/or switch resource 140 in general can be given higher priority execution privileges.

In certain instances, embedded networking systems require certain tasks to be performed in real-time or near real-time. For example, when a real-time task receives an event that must be executed in real-time, the processing thread must perform the necessary functions related to that event within a predictable and bounded amount of time.

In accordance with one embodiment, one such task that may need to be processed without delay or in substantially real-time is reception and processing of in-band critical packets (e.g., control plane packets 135) by a control plane central processing unit (CPU) operating in the control plane packet processing environment 160.

In one embodiment, the term "in-band" packets refers to control plane packets 135 received from one of I/O interface ports 110. The control plane packets 135 are classified as control or exception packets that must be handled by the CPU in the control plane packet processing environment 160. As discussed herein, processing by the CPU in the control plane packet processing environment 160 guarantees bounded and predictable latency for reception and processing of the control plane packets 135.

The proposed technique offers a comprehensive system-wide solution to processing control plane packets 135 within a time limit.

As shown in FIG. 2, packets (e.g., data packets 136 and control plane packets 135) are received on I/O ports 110. The classifier 122 function differentiates control plane packets 135 destined to the control plane CPU in the control plane packet processing environment 160 from data packets 136 that are forwarded by data packet forwarding resource 125 as previously discussed.

The classifier 120 assigns the control plane packets to a respective class queue in control plane packet storage 150 based on the type of the received control plane packet. The control plane packets 135 requiring lowest latency (e.g., immediate processing) and that are to be processed first in order are assigned and stored in a higher priority class queue such as queue 151-1. Classifier 120 assigns and stores medium priority control plane packets 135 in queue 151-2. Classifier 120 assigns and stores lowest priority control plane packets 135 in queue 151-3.

In conventional solutions, the main admission stage, class-based queues, and packet buffering stage are all maintained in the CPU memory. In accordance with one embodiment herein, the CPU memory is the physical memory that is directly attached to the processor and it is managed by the operating system 245. Additionally, in accordance with embodiments herein, the assumption is that there is a switch fabric between the I/O ports 110 and the control plane packet processing environment 160. The resources in such a switch fabric can include classifier 120, control plane packet storage 150, flow controller 155, and a network link from flow controller 155 to control plane packet processing environment 160. Admission, class-based queuing, and packet buffering functions are performed by such a switch fabric (e.g., circuitry disposed between input/output ports 110 and control plane packet processing environment 160 such as classifier 120, control plane packet storage 150, flow controller 155, etc.). This switch fabric circuitry is external to the control plane CPU and its respective memory in the control plane packet processing environment 160.

Embodiments herein provide better scalability over conventional techniques. For example, the switch fabric circuitry or pre-processing circuitry as discussed herein easily accommodates additional I/O ports, provides more buffering, more effective queuing/scheduling, and lower latency for dispatching critical packets to the control plane processing environment 160.

In one embodiment, the flow controller 155 is a CPU scheduler resource configured to dispatch packets to the control plane packet processing environment 160 via a network interface such as Ethernet port. The flow controller 155 maintains a flow control value 210 (e.g., a variable) configured to track the number of outstanding packets sent to the CPU in the control plane packet processing environment 160. Every time the flow controller 155 dispatches or forwards a packet to the control plane packet processing environment 160, the flow control value 210 is increased by a respective weight factor for the control plane packet or advanced by a count of one for the control plane packet. This flow controller 155 repeats the process each time a control plane packet is forwarded to the control plane packet processing environment 160.

During a process of forwarding control plane packet, whenever the flow control value 210 reaches a limit value or threshold value, the flow controller 155 stops dispatching or forwarding additional packets to the CPU in the control plane packet processing environment 160. The limitation value of the flow controller 155 can be configured by software during initialization. As the control plane packet processing environment 160 completes processing of the control plane packets 135, the flow controller 155 reduces the flow control value 210. In this manner, the flow controller 155 controls the number of packets that are dispatched to the control plane packet processing environment 160 for processing. Preventing forwarding of control plane packets 135 in queues 151 ensures that forwarded control plane packets 135 are processed within an acceptable time limit.

In one embodiment, as packets are received by the network interface between the flow controller 155 and the control plane packet processing environment 160, a DMA (Direct Memory Access) engine in the control plane packet processing environment 160 buffers the packets in packet buffer 220 (e.g., a portion of CPU memory) and queues a packet descriptors (e.g., tags, labels, pointers, etc.) into tag buffer 230 (e.g., a hardware-managed descriptor queue/ring). The tag buffer 230 can include a pointer or label indicating where a corresponding packet is stored in the packet buffer 220.

Monitor resource 235 maintains an interrupt packet count threshold value and an interrupt timer threshold value. The monitor resource 235 generates an interrupt to the operating system 240 if the number of packets as specified by labels or tags in the tag buffer (e.g., descriptor queue) grows to be greater than the interrupt packet count threshold, or the timer threshold value, which keeps track of how long a packet sits in the descriptor queue.

If the time that a label or tag in tag buffer 230 exceeds a time threshold value or number of labels or tags stored in the tag buffer exceeds a count value, the monitor resource 235 generates an interrupt signal to operating system 240. These two threshold values (e.g., time and count) control latency of processing the control plane packets in packet buffer 220 because execution of the packet notification thread 245 and generation of notification signals from the packet notification thread 245 causes forwarding of one or more notifications downstream to the packet processing thread 260 that control plane packets stored in packet buffer 220 need to be processed.

In one embodiment, the monitor resource 235 monitors at least one storage parameter such as time value 211 and/or count value 212. By way of a non-limiting example, the time value 211 can represent how long at least one control plane packet is stored in the packet buffer 220. The storage parameters (e.g., time value 211, packet count value 212, etc.) are indicative of a presence of the control plane packets in the packet buffer 220. In response to detecting that one or both of the storage parameters exceeds a respective threshold value, the monitor resource 235 initiates generation of an interrupt to operating system 240 to expedite scheduling and processing of the control plane packets 135 in the packet buffer 220 via the packet processing thread 260.

In response to detecting the interrupt generated by monitor resource 235, the operating system 240 initiates execution of packet notification thread 245 (e.g., a Receive Packet Thread) on the software. In one embodiment, the packet notification thread 245 reads the information stored in the tag buffer 230 and writes the packet descriptor (e.g., tag or label) to an appropriate software queue of priority queues 250. The packet notification thread can be an independent, high priority threads running on operating system 240.

In one embodiment, the packet notification thread 245 is awakened by the operating system 240 when the monitor resource 235 (e.g., Kernel interrupt driver) sends an OS signal to the operating system 240. The packet notification thread 245 goes to sleep after awaking and moving all or a predetermined number of respective tags or labels stored in the tag buffer 230 to priority queues 250.

In accordance with one embodiment, a behavior of the packet notification thread 245 is deterministic and has a short execution time because the packet notification thread 245 is configured with high priority scheduling parameters. By placing the task of forwarding descriptors or labels in an independent OS thread (e.g., the packet notification thread 245) and setting its thread scheduling parameters appropriately, embodiments herein provide another knob to control the latency in a predictable fashion.

Packet processing thread 260 includes a software scheduler. The software scheduler services priority queues 250. In one embodiment, the priority queues 250 are software based queues. The packet processing thread 260 executes the software-based queues in a strict priority order. For example, high priority queues 250 are serviced first followed by servicing of medium priority queues 250, followed by servicing of lower priority queues 250.

When servicing the priority queues, the packet processing thread 260 retrieves a label, tag, descriptor, etc., from the priority queue 250. Based on the descriptor values, the packet processing thread 260 initiates retrieval of a corresponding control plane packet stored in packet buffer 220. As previously discussed, the descriptor stored in priority queues 250 can be or include a pointer to the location in packet buffer 220 where the corresponding control plane packet is stored.

The packet processing thread 260 retrieves the control plane packets as specified by the descriptors and processes the received control plane packets. Subsequent to completing processing of the control plane packet from packet buffer 220, the packet processing thread 260 generates an acknowledgment signal to flow controller 220. Based on receipt of the acknowledgment, the flow controller modifies a magnitude of the flow control value 210. As an example, the flow controller 155 can decrement the flow control value 210 by one or a respective weight value to indicate that a previously forwarded control plane packet has been completely processed. As previously discussed, upon decrementing the flow control value 210 and detecting that the flow control value 210 is below a threshold value, the flow controller 155 can forward one or more control plane packets to packet buffer 220.

By having the packet processing thread 260 as its own independent operating system thread and servicing the software-based queues 250 in a strict priority manner from high priority queues to lower priority queues, embodiments herein provide yet another way to control the latency of processing control plane packets 135 in a deterministic manner.

Figure 3:
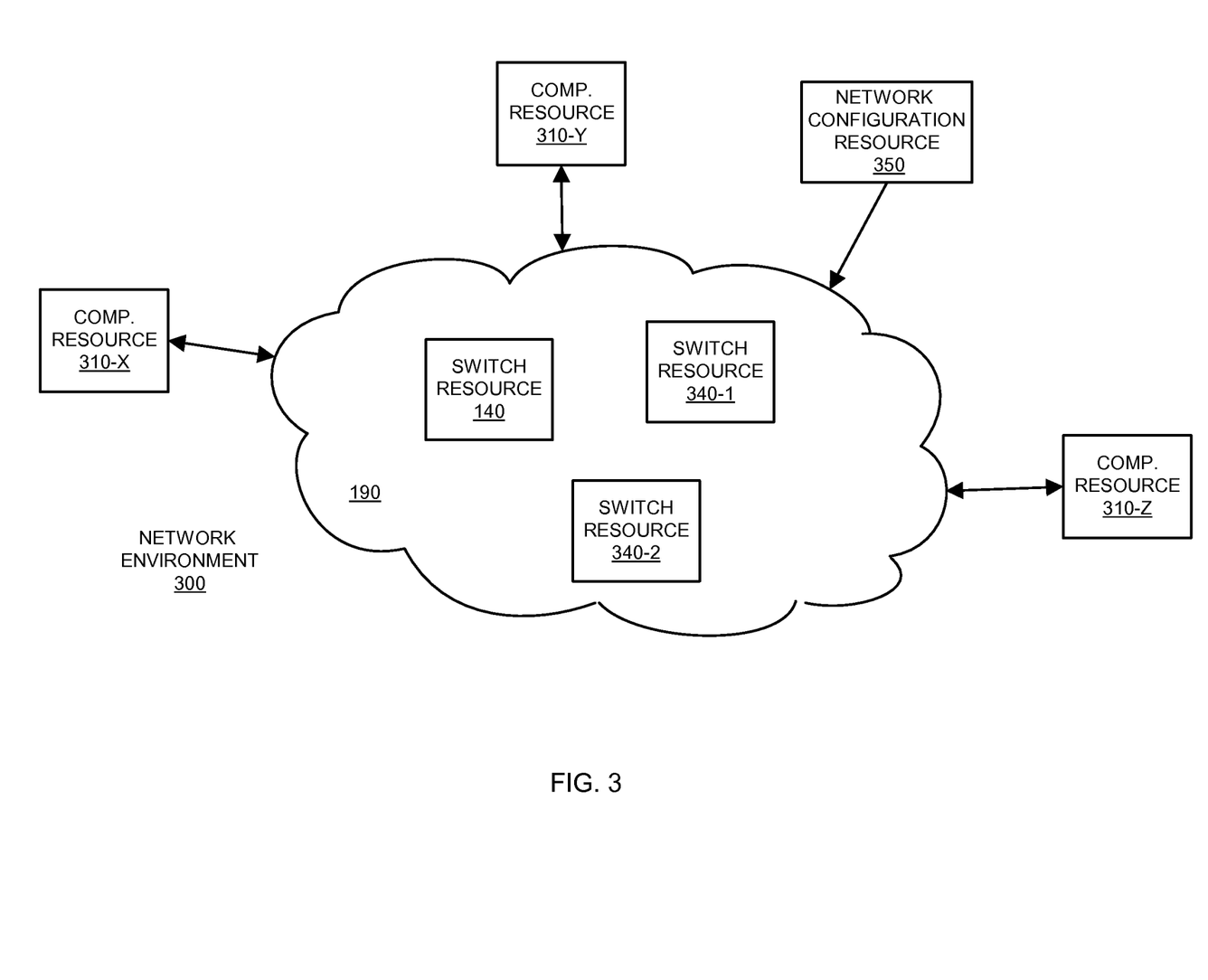
FIG. 3 is an example diagram of a network including one or more switch resources configured according to embodiments herein.

FIG. 3 is an example diagram illustrating a network including one or more switch resources according to embodiments herein.

As shown, network environment 300 includes network 190, computer resource 310-X, computer resource 310-Y, computer resource 310-Z, etc. Network 190 includes switch resource 140 as well as switch resource 340-1, 340-2, etc. Each of switch resources 340 (e.g., switch resource 340-1, 340-2, etc.) can be configured to operate in a similar manner as switch resource 140.

During operation, each of switch resources routes data packets 136 in accordance with a configuration of network 190. As an example, computer resource 310-X can send data packets to computer resource 310-Z via routing of the data packets through one or more of the switch resources in network 190.

Note that each of the switch resources in network 190 can receive control plane packets 135 from sources such as from other switch resources, network configuration resource 350, etc.

Figure 4:
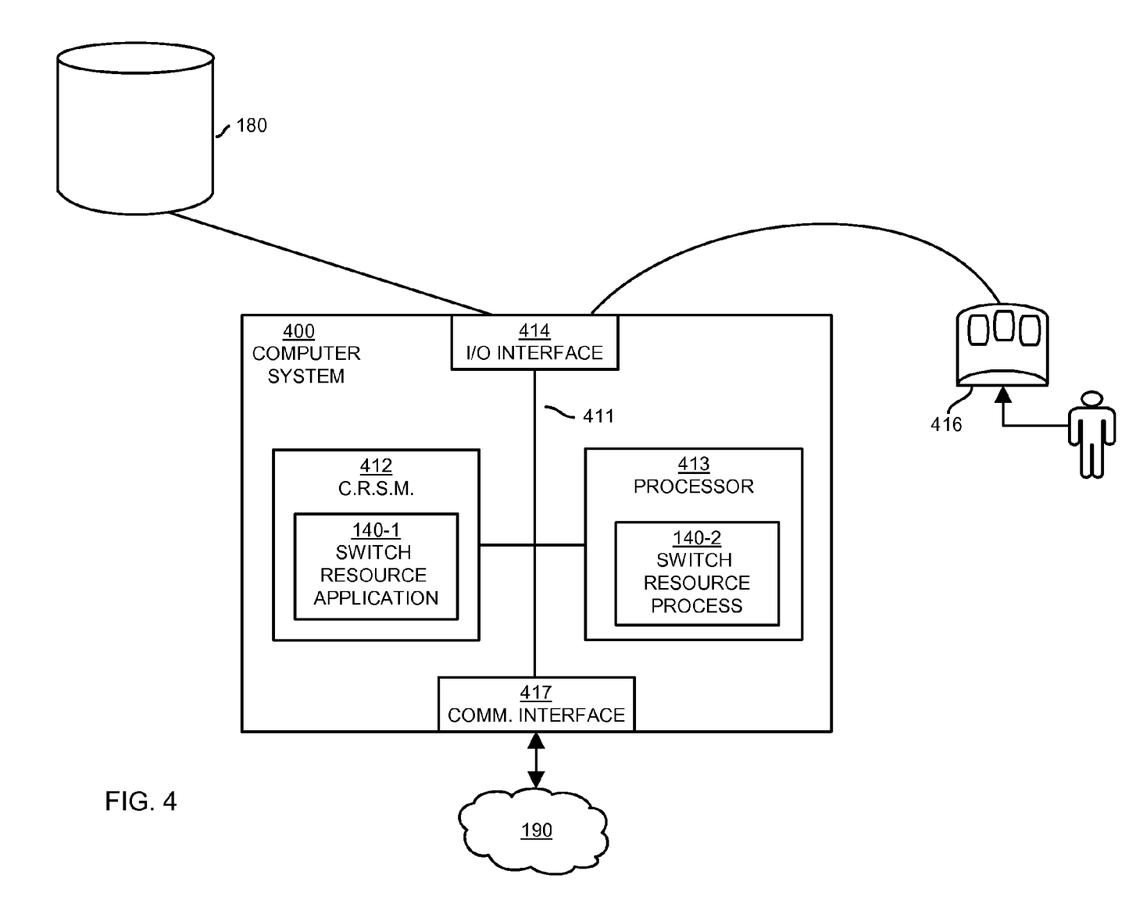
FIG. 4 is a diagram illustrating an example computer architecture for executing computer code, software, applications, logic, etc., according to embodiments herein.

FIG. 4 is an example block diagram of a computer system 400 that provides computer processing according to embodiments herein. Note that the each switch resource as discussed herein can include one or more resources similar to computer system 400 to carry out operations as discussed herein.

Computer system 400 can be or include a computerized device such as a personal computer, workstation, portable computing device, console, network terminal, processing device, network device, operating as a switch, router, server, client, etc.

Note that the following discussion provides a basic embodiment indicating how to carry out functionality associated with switch resource 140 as previously discussed. However, it should be noted that the actual configuration for carrying out the operations as described herein can vary depending on a respective application.

As shown, computer system 400 of the present example includes an interconnect 411 that couples computer readable storage media 412 such as a non-transitory type of media, computer readable, hardware storage medium, etc., in which digital information can be stored and retrieved. Computer system 400 can further include a processor 413 (e.g., hardware 115), I/O interface 414, and a communications interface 417.

I/O interface 414 provides connectivity to repository 180, and if present, display screen, peripheral devices 416 such as a keyboard, a computer mouse, etc.

Computer readable storage medium 412 (e.g., a hardware storage media) can be any suitable device and/or hardware such as memory, optical storage, hard drive, floppy disk, etc. The computer readable storage medium can be a non-transitory storage media to store instructions associated with switch resource application 140-1. The instructions are executed by a respective resource such as switch resource 140 to perform any of the operations as discussed herein.

Communications interface 417 enables computer system 400 to communicate over network 190 to retrieve information from remote sources and communicate with other computers, switches, clients, servers, etc. I/O interface 414 also enables processor 413 to retrieve or attempt retrieval of stored information from repository 180.

As shown, computer readable storage media 412 can be encoded with network application 140-1 executed by processor 413 as switch resource process 140-2.

In an example embodiment, note that the switch resource 140 also can be embodied to include a computer readable storage medium (e.g., a hardware, non-transitory media) for storing data and/or logic instructions. Computer system 400 can include a processor to execute such instructions and carry out network management operations as discussed herein. Accordingly, when executed, the code associated with switch resource application 140-1 can support processing functionality such as forwarding of data packets, processing of control plane packets, etc., as discussed herein.

During operation of one embodiment, processor 413 accesses computer readable storage media 412 via the use of interconnect 411 in order to launch, run, execute, interpret or otherwise perform the instructions of switch resource application 140-1 stored in computer readable storage medium 412. Execution of the switch resource application 140-1 produces processing functionality in processor 513. In other words, the switch resource process 140-2 associated with processor 413 represents one or more aspects of executing switch resource application 140-1 within or upon the processor 413 in the computer system 400.

Those skilled in the art will understand that the computer system 400 can include other processes and/or software and hardware components, such as an operating system that controls allocation and use of hardware processing resources to execute switch resource application 140-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Functionality supported by components in switch resource 140 will now be discussed via flowcharts in FIGS. 5-8. As discussed above, the switch resource application 140-1 executed by a respective switch and/or other hardware can be configured to execute the steps in the flowcharts as discussed below.

Note that there will be some overlap with respect to concepts discussed above for FIGS. 1 through 4. Also, note that the steps in the flowcharts need not always be executed in the order shown. The steps can be executed in any suitable order.

Figure 5:
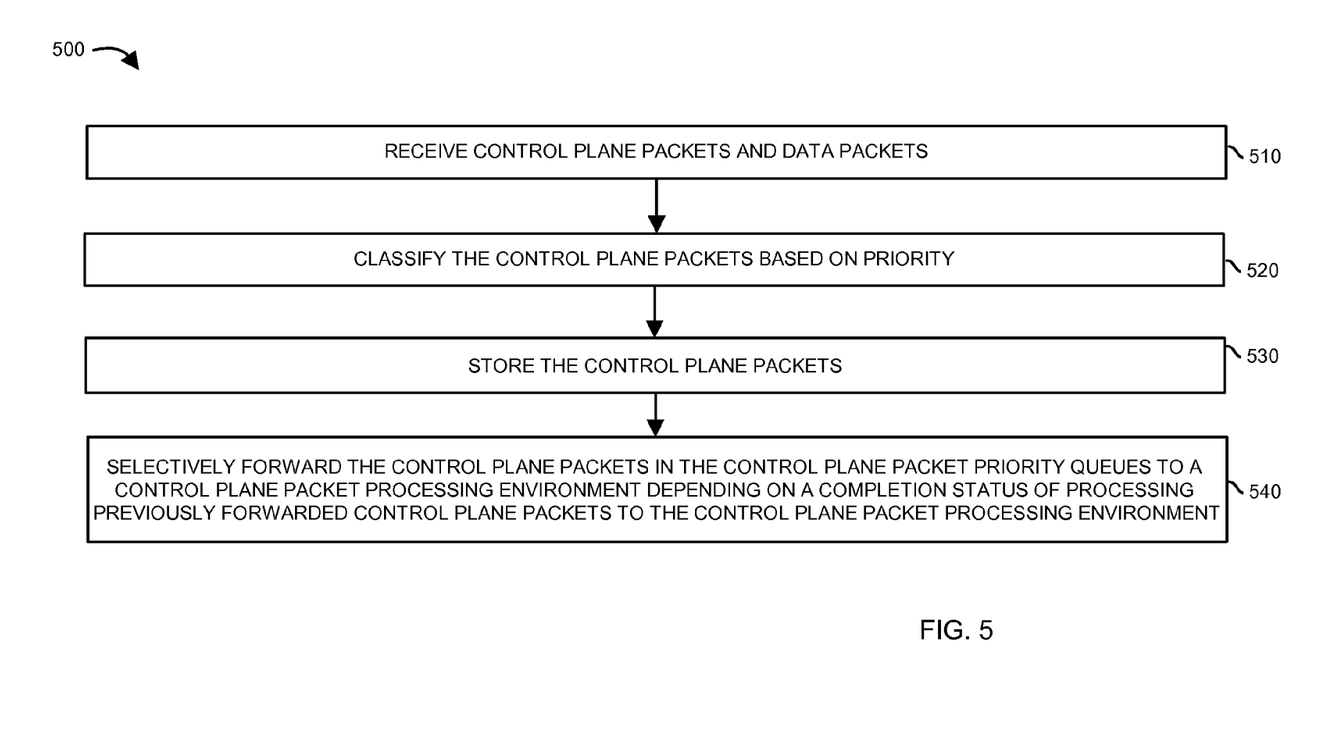
FIG. 5 is a flowchart illustrating an example method of selectively forwarding control plane packets according to embodiments herein.

FIG. 5 is a flowchart 500 illustrating a method of processing control plane packets according to embodiments herein.

In step 510, via ports 110, the switch resource 140 receives control plane packets 135 and data packets 136.

In step 520, the classifier 120 of switch resource 140 classifies the control plane packets 135 based on priority.

In step 530, the classifier 120 of switch resource 140 stores the control plane packets 135.

In step 540, the flow controller 155 of switch resource 140 selectively forwards the control plane packets 135 in the priority queues 151 of control plane packet storage 150 to a control plane packet processing environment 160 depending on a completion status of processing previously forwarded control plane packets to the control plane packet processing environment 160.

Figure 6:
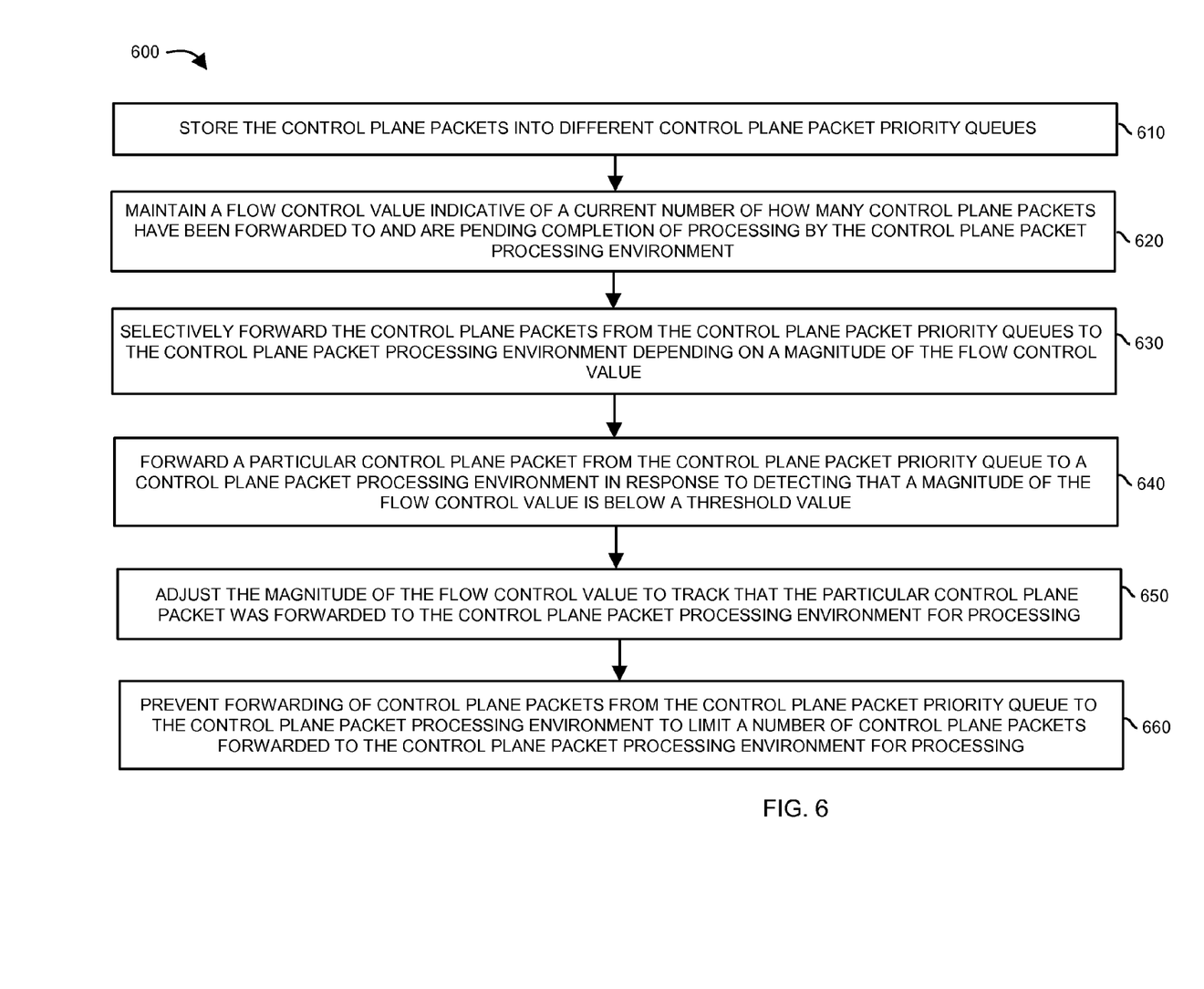
FIG. 6 is a flowchart illustrating an example method of processing control plane packets according to embodiments herein.

FIG. 6 is a flowchart 600 illustrating a method of processing control plane packets according to embodiments herein.

In step 610, the classifier 120 stores the control plane packets 135 into different control plane packet priority queues 151 depending on priority associated with the control plane packets 135.

In step 620, the flow controller 155 maintains a flow control value 210 indicative of a current number of how many control plane packets 135 have been forwarded to and are pending completion of processing by (e.g., a CPU in) the control plane packet processing environment 160.

In step 630, flow controller 155 selectively forwards the control plane packets from the control plane packet priority queues 151 to the control plane packet processing environment depending on a magnitude of the flow control value 210.

In step 640, the flow controller 155 forwards a particular (e.g., selected) control plane packet from the control plane packet priority queue 151-1 to the control plane packet processing environment 160 in response to detecting that a magnitude of the flow control value 210 is below a threshold value. When the flow control value 210 is below the threshold value, one or more additional control plane packets can be forwarded to the control plane packet processing environment 160 for processing.

In step 650, for the particular control plane packet forwarded to the control plane packet processing environment 160, the flow controller 155 adjusts the magnitude of the flow control value 210 to track that the particular control plane packet was forwarded to an display pending processing by the control plane packet processing environment 160.

In step 660, assume that the flow control value is now greater than the threshold value. In such an instance, the flow controller 155 prevents forwarding of control plane packets from the control plane packet priority queues 151 to the control plane packet processing environment 160 to limit a number of control plane packets 135 that are forwarded to the control plane packet processing environment 160 for processing.

Figure 7:
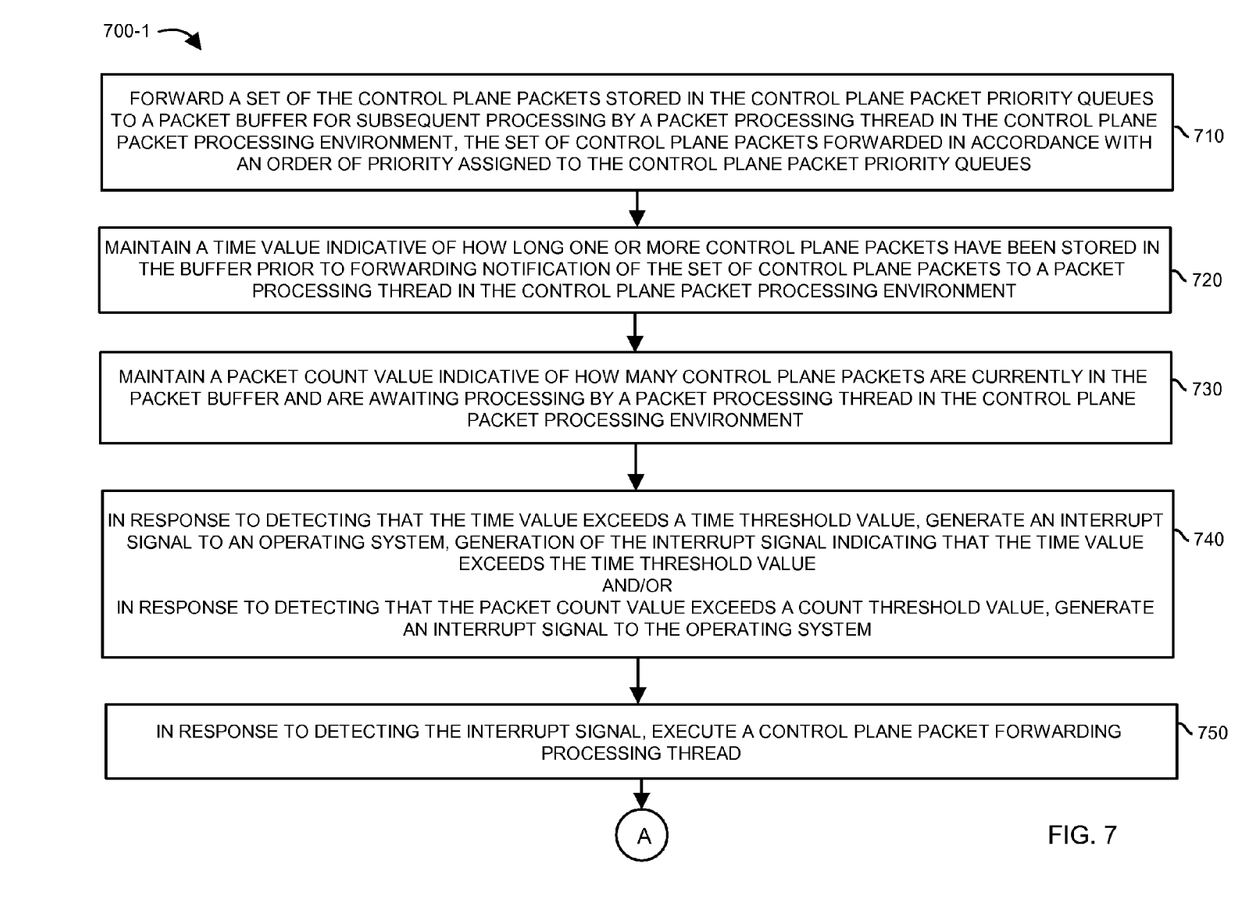
FIGS. 7 and 8 combine to form a flowchart illustrating a more specific example method of processing control plane packets according to embodiments herein.
Figure 8:
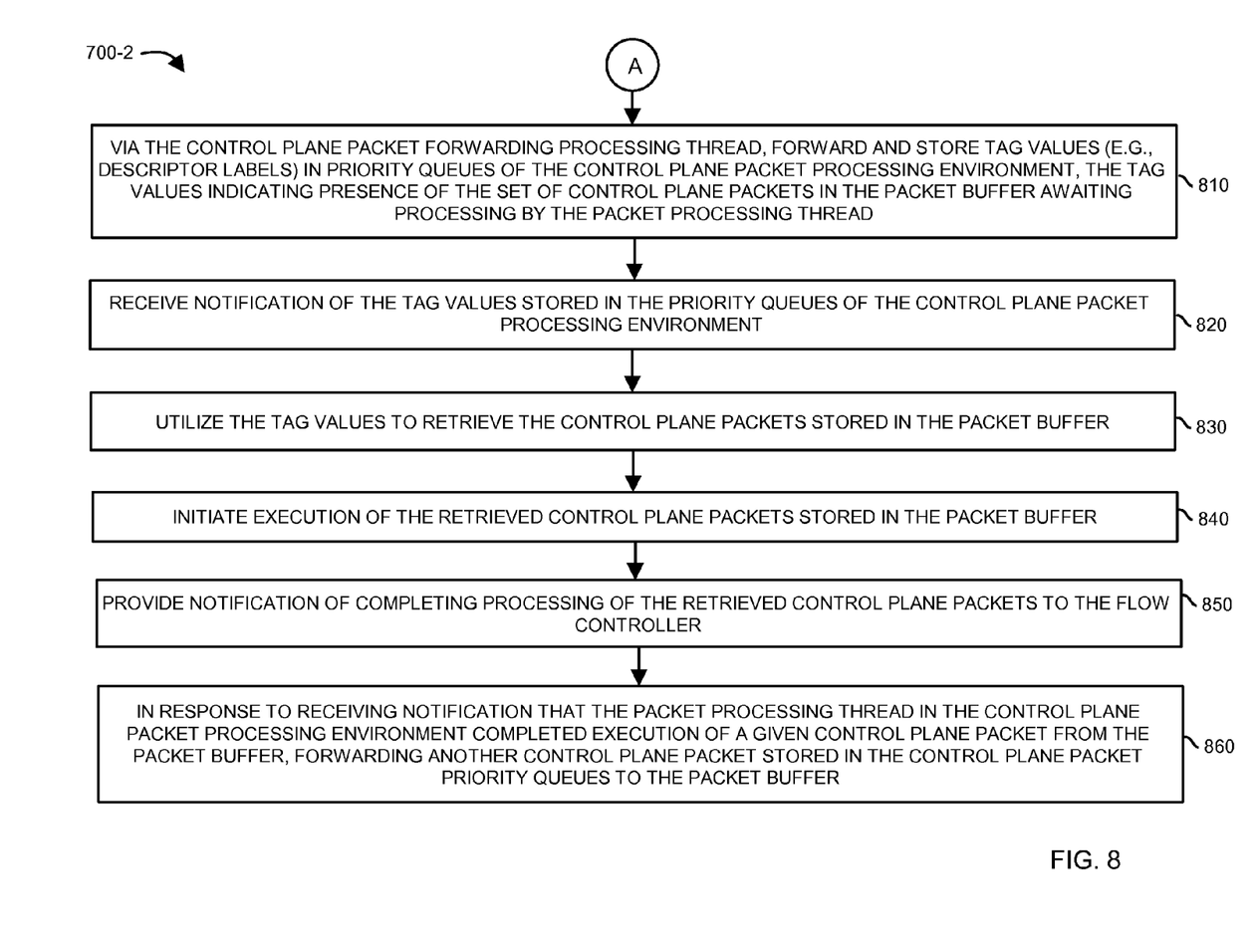

FIGS. 7 and 8 combine to form a flowchart 700 (e.g., flowchart 700-1 and flowchart 700-2) illustrating forwarding and processing of control plane packets according to embodiments herein.

In step 710, the flow controller 155 forwards a set of the control plane packets stored in the control plane packet priority queues 151 to a packet buffer 220 for subsequent processing by a packet processing thread 260 in the control plane packet processing environment 160. In one embodiment, the set of control plane packets are forwarded in accordance with an order of priority assigned to the control plane packet priority queues 151. In other words, higher priority queues may be serviced first followed by lower priority queues.

In step 720, the monitor resource maintains a time value 211 indicative of how long one or more control plane packets 135 have been stored in the packet buffer 220 prior to forwarding notification of the set of control plane packets to a packet processing thread in the control plane packet processing environment 160.

In step 730, the flow controller 155 maintains a packet count value 212 indicative of how many control plane packets 135 are currently in the packet buffer 220 and are awaiting processing by packet processing thread 260 in the control plane packet processing environment 160.

Any of multiple different conditions can cause the monitor resource to generate an interrupt request. For example, if the time value 211 is greater than a threshold value, the monitor resource 235 issues an interrupt request. If the packet count value 212 is greater than a threshold value, the monitor resource 235 issues an interrupt request.

Now, more specifically, in step 740, in response to detecting that the time value 211 exceeds a time threshold value, the monitor resource 235 generates an interrupt signal to operating system 240. Generation of the interrupt signal indicates that the time value exceeds the time threshold value and that the control plane packets stored in packet buffer 220 need to be serviced.

As an alternative to step 740, in step 750, in response to detecting that the packet count value 212 exceeds a count threshold value, the monitor resource 235 generates an interrupt signal to the operating system 240.

In step 710, in response to detecting the interrupt signal, the operating system 240 wakes up and executes a control plane packet forwarding processing thread (e.g., packet notification thread 245.

Following in step 810 of FIG. 8, the control plane packet forwarding processing thread (e.g., packet notification thread 245) forward and store tag values (e.g., descriptors, labels, etc.) in priority queues 250 of the control plane packet processing environment 160. In one embodiment, the tag values stored in priority queues 250 indicate a presence of the set of control plane packets stored in the packet buffer 220 awaiting processing by the packet processing thread 260.

In step 820, the packet processing thread 260 receives notification of the tag values (e.g., labels, descriptors, etc.) stored in the priority queues 250 of the control plane packet processing environment 160.

In step 830, the packet processing thread 260 utilizes the tag values stored in priority queues 250 to identify and retrieve the control plane packets 135 stored in the packet buffer 220 awaiting processing.

In step 840, the packet processing thread 260 initiates execution and/or processing of the retrieved control plane packets 135 stored in the packet buffer 220. In one embodiment the information stored in priority queues 250 indication of a location of where the control plane packets to be processed are stored in the packet buffer 220.

In step 850, the flow controller 155 provides notification, to the flow controller 155, of completing processing of the control plane packets retrieved from packet buffer 220. In other words, upon completing processing of the control plane packets in packet buffer 220, the packet processing thread 260 sends an acknowledgment back to the flow controller 155. The process of sending acknowledgments can include sending an acknowledgment message to the flow controller 155 for each completion of processing a respective control plane packet 150. As previously discussed, the flow controller 155 adjusts the flow control value 210 based on receipt of the one or more acknowledgment messages from the packet processing thread 260.

In step 860, in response to receiving the acknowledgment notification that the packet processing thread 260 in the control plane packet processing environment 160 completed execution of a given control plane packet or multiple control plane packets from the packet buffer 220, assuming that the flow control value 210 is below a threshold value after adjusting the flow control value 210 as previously discussed, the flow controller 155 forwards another control plane packet stored in the control plane packet priority queues to the packet buffer 220. In this way, as the packet processing thread 260 completes processing of previously forwarded control plane packets 135, the flow controller 155 forwards more control plane packets stored in queues 151 to the packet buffer 220 for processing by the packet processing thread 260.

Note again that techniques herein are well suited for use in processing control plane packets 135 in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving control plane packets and data packets;
    classifying the control plane packets;
    storing the control plane packets into different control plane packet priority queues;
    selectively forwarding the control plane packets in the control plane packet priority queues to a control plane packet processing environment depending on a completion status of processing previously forwarded control plane packets to the control plane packet processing environment;
    storing, in a packet buffer, a set of control plane packets that have been forwarded from the control plane packet priority queues to the control plane packet processing environment for processing;
    producing a time value indicative of how long the set of control plane packets have been stored in the buffer prior to forwarding notification of the set of control plane packets towards a packet processing thread in the control plane packet processing environment;
    in response to detecting that the time value exceeds a time threshold value, generating an interrupt signal to an operating system, the interrupt signal indicating that the time value exceeds the time threshold value;
    in response to detecting the interrupt signal, executing a control plane packet forwarding processing thread; and
    via control plane packet forwarding processing thread, storing tag values in priority queues of the control plane packet processing environment, the tag values indicating presence of the set of control plane packets in the packet buffer awaiting processing by the packet processing thread.

2. The method as in claim 1, wherein selectively forwarding the control plane packets in the control plane packet priority queues further comprises:
    forwarding the control plane packets stored in the control plane packet priority queues in accordance with an order of priority assigned to the control plane packet priority queues.

3. The method as in claim 1, wherein selectively forwarding the control plane packets in the control plane packet priority queues further comprises:
    forwarding the set of control plane packets in the control plane packet priority queues to the packet buffer for subsequent processing by the packet processing thread in the control plane packet processing environment; and
    in response to receiving the notification that the packet processing thread completed execution of a given control plane packet from the packet buffer, forwarding another control plane packet stored in the control plane packet priority queues to the packet buffer.

4. The method as in claim 1 further comprising:
    monitoring at least one storage parameter, the storage parameter indicative of a presence of the control plane packets in the packet buffer; and
    in response to detecting that the storage parameter exceeds a threshold value, initiating generation of an interrupt to the operating system to expedite scheduling and processing of the control plane packets in the packet buffer via a packet processing thread.

5. The method as in claim 1 further comprising:
    in response to receiving notification that the packet processing thread completed execution of a given control plane packet stored in the packet buffer, forwarding another control plane packet in the control plane packet priority queues to the packet buffer.

6. The method as in claim 1, wherein selectively forwarding the control plane packets includes:
    maintaining a flow control value indicative of a current number of how many control plane packets have been forwarded to and are pending completion of processing by the control plane packet processing environment;
    selectively forwarding the control plane packets to the control plane packet processing environment depending on a magnitude of the flow control value.

7. The method as in claim 6, wherein selectively forwarding the control plane packets includes: forwarding a particular control plane packet from the control plane packet priority queues to the control plane packet processing environment in response to detecting that a magnitude of the flow control value is below a threshold value; and adjusting the magnitude of the flow control value to track that the particular control plane packet was forwarded to a control plane packet processing environment for processing.

8. The method as in claim 7, wherein selectively forwarding the control plane packets includes:
    in response to receiving a notification that the control plane packet processing environment completed processing of the particular control plane packet, adjusting the magnitude of the flow control value to account for completion of processing the particular control plane packet.

9. The method as in claim 7, wherein selectively forwarding the control plane packets includes: preventing forwarding of control plane packets from the control plane packet priority queues to the control plane packet processing environment to limit a number of control plane packets forwarded to the control plane packet processing environment for processing.

10. The method as in claim 1 further comprising:
    at the packet processing thread in the control plane packet processing environment:
        receiving notification of the tag values;
        utilizing the tag values to retrieve the control plane packets stored in the different control plane packet priority queues;
        executing the retrieved control plane packets; and
        providing notification of completing processing of the retrieved control plane packets.

11. The method as in claim 1 further comprising:
    limiting a number of control plane packets stored in the packet buffer to ensure processing of the control plane packets within a pre-specified amount of time.

12. The method of claim 1 wherein said interrupt signal causes said operating system to execute a control plane packet forwarding thread wherein processing of control plane packets in the packet buffer happen with minimal delay.

13. A system comprising:
    a memory;
    a processor;

a communications interface;
an interconnection mechanism coupling the memory, the processor and the communications interface;
ports on which to receive control plane packets and data packets;
a classifier resource configured to classify the control plane packets;
control plane packet priority queues to store the control plane packets; wherein the memory is encoded with an application providing a forwarding manager resource configured to selectively forward the control plane packets in the control plane packet priority queues to a control plane packet processing environment depending on a completion status of processing previously forwarded control plane packets to the control plane packet processing environment;
a packet processing thread, the packet processing thread configured to configure at least a portion of a control plane of a network that routes the data packets based on the control plane packets;
wherein the manager resource forwards a set of control plane packets in the control plane packet priority queues to a packet buffer for processing by the packet processing thread in the control plane packet processing environment;
a monitor resource to monitor a storage parameter, the storage parameter indicative of a presence of the control plane packets in a packet buffer;
wherein the monitor resource initiates generation of an interrupt to an operating system to expedite scheduling and processing of the control plane packets in the packet buffer by the packet processing thread in response to detecting that the storage parameter exceeds a threshold value;
a control plane packet forwarding processing thread configured to be executed in response to detecting the interrupt signal; and
wherein the control plane packet forwarding processing thread storing tag values in priority queues of the control plane packet processing environment, the tag values indicating presence of the set of control plane packets in the packet buffer awaiting processing by the packet processing thread.

14. The system in claim 13 further comprising: wherein the manager resource forwards a next highest priority control plane packet stored in one of the control plane packet priority queues to the packet buffer in response to receiving notification that the packet processing thread completed execution of a control plane packet in the packet buffer.

15. The system in claim 14, wherein the manager resource maintains a flow control value indicative of a current number of control plane packets that have been forwarded to and that are pending completion of processing by the control plane packet processing environment; and
wherein the manager resource selectively forwards the control plane packets to the control plane packet processing environment depending on a magnitude of the flow control value.

16. The system in claim 15, wherein the manager resource adjusts the magnitude of the flow control value to account for forwarding of a control plane packet from a control plane packet priority queue to the packet buffer.

17. The system of claim 13 wherein said interrupt signal causes said operating system to execute a control plane packet forwarding thread; wherein processing of control plane packets in the packet buffer happen with minimal delay.

18. A non-transitory computer-readable storage hardware having instructions stored thereon, the instructions, when carried out by a processing device, causes the processing device to perform operations of:
receiving control plane packets and data packets;
classifying the control plane packets based on priority;
storing the control plane packets into different control plane packet priority queues;
selectively forwarding the control plane packets in the control plane packet priority queues to a control plane packet processing environment depending on a completion status of processing previously forwarded control plane packets to the control plane packet processing environment;
storing, in a packet buffer, a set of control plane packets that have been forwarded from the control plane packet priority queues to the control plane packet processing environment for processing;
providing a packet processing thread, the packet processing thread configured to configure at least a portion of a control plane of a network that routes the data packets based on the control plane packets;
providing a monitor resource to monitor a storage parameter, the storage parameter indicative of a presence of the control plane packets in the packet buffer; and
wherein the monitor resource initiates generation of an interrupt to an operating system to expedite scheduling and processing of the control plane packets in the packet buffer by the packet processing thread in response to detecting that the storage parameter exceeds a threshold value;
in response to detecting the interrupt signal, executing a control plane packet forwarding processing thread; and
via the control plane packet forwarding processing thread storing tag values in priority queues of the control plane packet processing environment, the tag values indicating presence of the set of control plane packets in the packet buffer awaiting processing by the packet processing thread.

19. The computer readable storage hardware of claim 18 wherein said interrupt signal causes said operating system to execute a control plane packet forwarding thread wherein processing of control plane packets in the packet buffer happen with minimal delay.

* * * * *